G. E. HAZARD.
ATTACHMENT FOR AUTOMOBILE DRIVEN TIRE PUMPS.
APPLICATION FILED JULY 21, 1919.
1,334,857.
Patented Mar. 23, 1920.
2 SHEETS—SHEET 2.
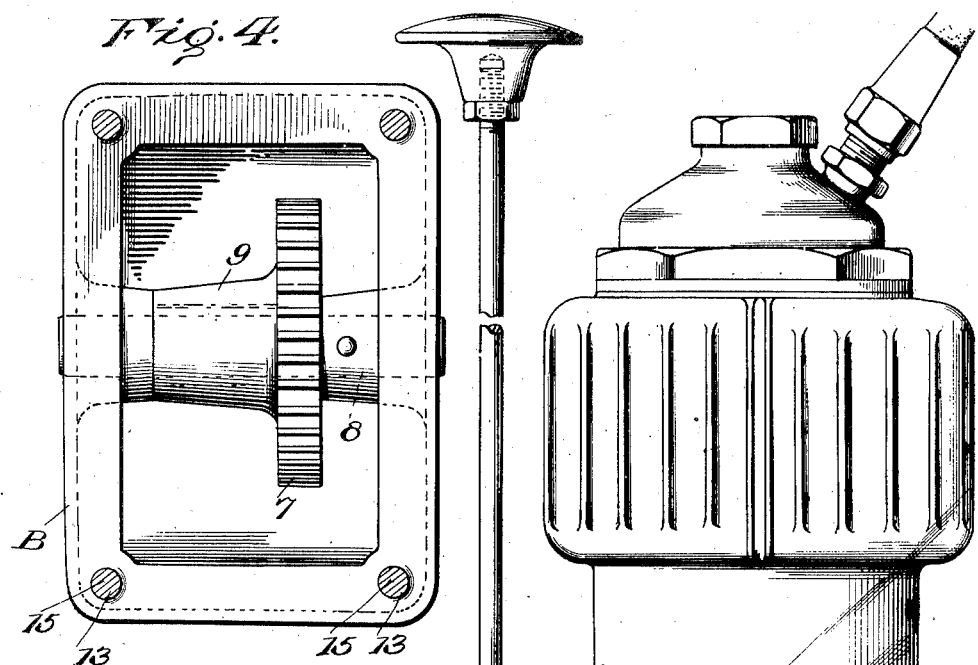
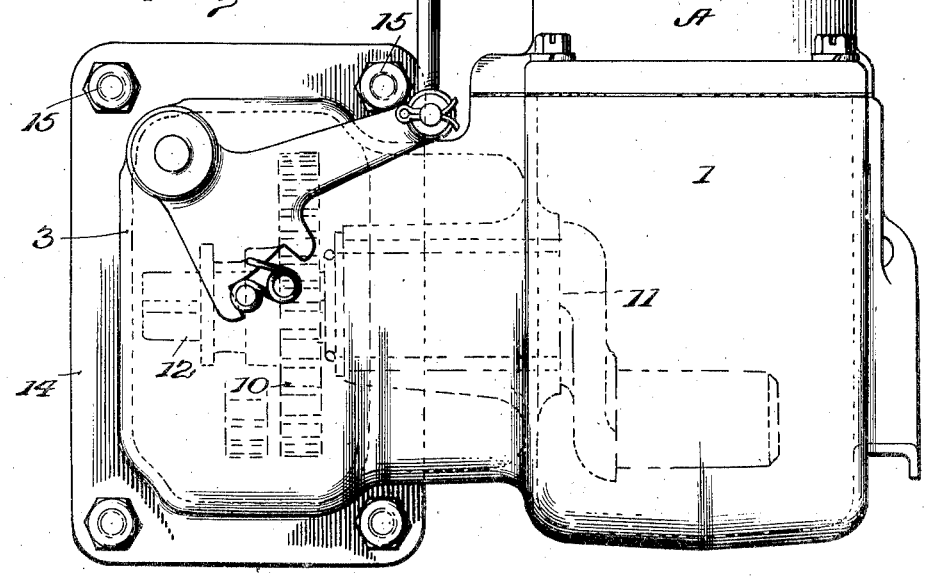
Inventor.
G. E. Hazard
by A. S. Pattison
his Attorney.

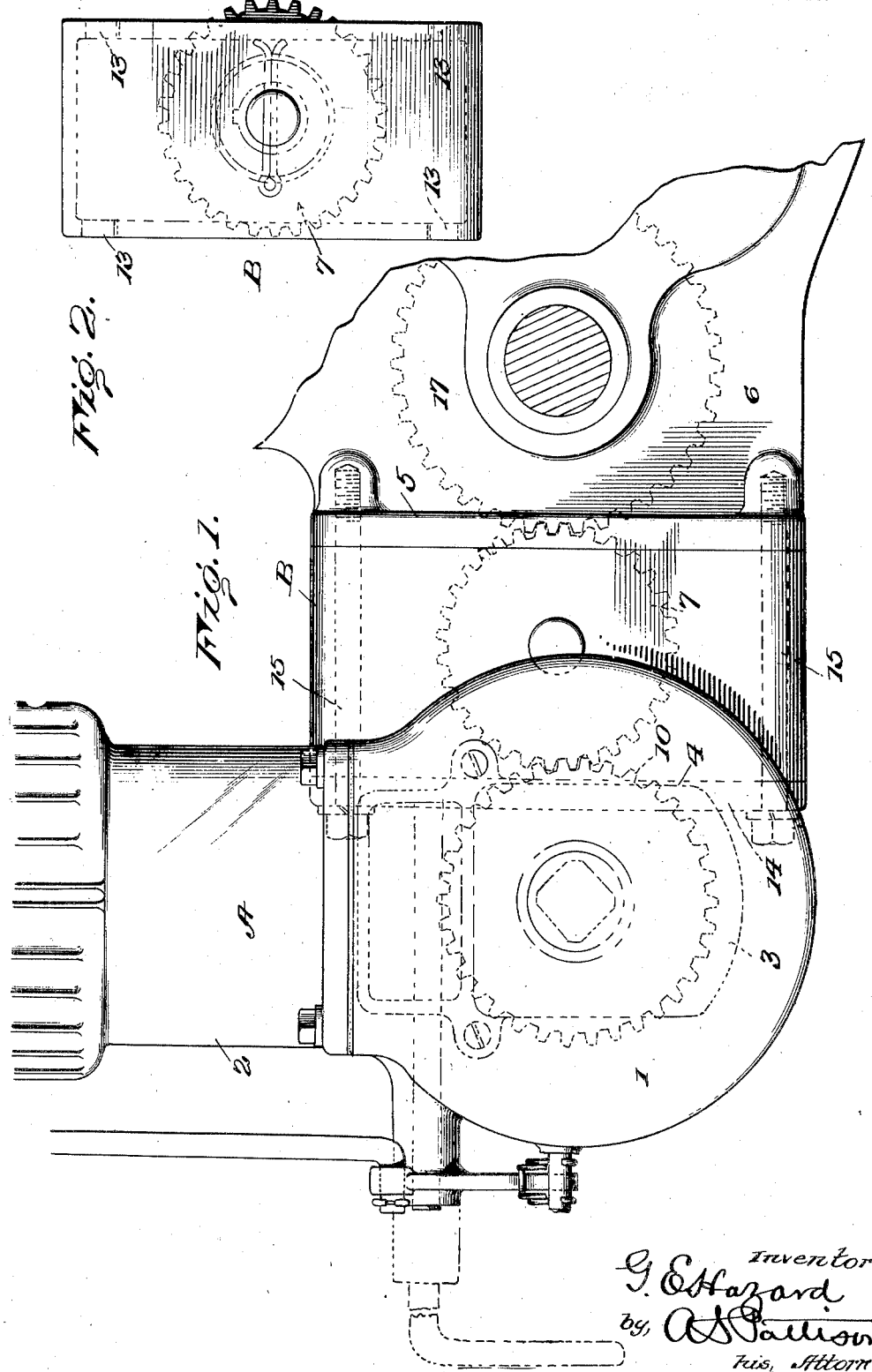

UNITED STATES PATENT OFFICE.

GEORGE EDGAR HAZARD, OF ROCHESTER, NEW YORK, ASSIGNOR TO KELLOGG MANUFACTURING CO., OF ROCHESTER, NEW YORK.

ATTACHMENT FOR AUTOMOBILE-DRIVEN TIRE-PUMPS.

1,334,857.  Specification of Letters Patent.  Patented Mar. 23, 1920.

Application filed July 21, 1919. Serial No. 312,364.

*To all whom it may concern:*

Be it known that I, GEORGE E. HAZARD, a citizen of the United States, residing at Rochester, in the county of Monroe and State of New York, have invented certain new and useful Improvements in Attachments for Automobile - Driven Tire - Pumps, of which the following is a specification, reference being had therein to the accompanying drawing.

This invention relates to improvements in attachments for automobile driven tire pumps, and it pertains to that class of pump which comprises an open-sided gear case, adapted to be connected with an automobile transmission case, whereby the pump is driven by the automobile transmission gearing.

The primary object is to provide means whereby a standarized automobile driven tire pump of the above construction can be used in connection with and driven by automobiles having arrangements which would otherwise prevent the use of the standardized pump.

Where it is necessary to make a special pump to meet the conditions of a particular type of gear, it adds to the expense of the equipment and at the same time should the pump become wrecked or need to be replaced, it will require the specially constructed pump, thus preventing the use of a standardized pump to the inconvenience and expense of the owner.

By the use of my present improvement, a standardized pump of the type described can be used, thus cutting out the added expense and inconvenience arising from the necessity of using a specially constructed pump.

In the accompanying drawings—

Figure 1 is an end view showing a standardized pump with my improvement applied, to enable it to be operatively connected with the transmission case and mechanism of a car, which otherwise could not use the standardized pump.

Fig. 2 is a detached end view of my improvement.

Fig. 3 is a front elevation of a standardized pump, showing it with my improvement applied thereto.

Fig. 4 is a detached face view of my improvement.

Referring now to the drawings, A represents a standard pump, which comprises a pump housing 1, having mounted thereon a cylinder, or cylinders, 2, and a gear case 3 at one side of the housing 1. This gear case 3 has an open side 4, which, when used with the standardized car construction, is in communication with the opening 5 of the automobile transmission case 6.

My improvement consists of a separate connecting housing B, which has journaled therein an intermediate or idler gear 7. This gear is mounted on a shaft 8 that is supported in the housing B, and the gear is provided with an elongated hub 9 to hold it against any sliding movement in respect to the shaft 8. The standardized pump A carries in its gear case 3 a gear 10, for driving the pump crank-shaft 11, and this gear 10 is slidable on the end 12 of the shaft which is located in the gear case 3, for the purpose of moving the gear 10 in and out of mesh with the idler gear 7. This shifting gear 10 is a part of the standardized pump that is used in the standard construction for automobiles.

Most of the automobiles of the better grade have standardized their transmission case to receive a driven tire pump of the type here shown, which has its gear case of a corresponding standardized size and shape to fit the standardized opening of the automobile transmission case. However, there are automobile constructions that have the standardized opening in the transmission case, but have some internal or external, or both, construction which will prevent the application to it of the standardized gear case of the pump, and it is to enable the standardized pump to be connected with the last mentioned construction of automobile that my improvement is devised.

The connecting housing B is made of a size to fit the standardized pump gear case 3 and the standardized opening 5 in the automobile case 6. This housing is hollow, as shown in Fig. 4, and is provided with bolt openings 13, which register with the bolt openings in the flange 14, for the bolts 15. These bolts 15 are elongated and pass through the flange 14, and the connecting housing B and into the automobile transmission case 6, thus clamping the pump construction and the connecting housing firmly in position on the transmission case. The gearing carried by the connecting housing

B, forms an intermediate gear mechanism between the transmission gear 17 and the pump gear 10.

This improvement enables the standardized tire pump of the type described to be operatively connected with an automobile transmission case to which it otherwise could not be attached.

Having thus described my invention, what I claim and desire to secure by Letters Patent is:—

1. The combination with an automobile transmission case having an opening in its side, and a standardized tire pump construction having a gear case with a side opening registering with the transmission case opening, of a separate attachable connecting housing between and establishing communication between the openings of the two cases, the housing carrying a gear to operatively connect gears in the two cases, whereby a standardized tire pump construction can be used with various special automobile arrangements which otherwise prevents its use.

2. The combination with an automobile transmission case carrying gears and having a standardized side opening communicating with one of the gears, and a standardized tire pump construction having a gear case with a side opening registering with the transmission case opening, of a separate attachable connecting housing between and establishing communication between the openings of the two cases, the housing carrying a gear located in the housing to be in fixed mesh with one of the transmission case gears, and the pump gear case having a laterally slidable gear adapted to be moved in and out of mesh with the housing gear, all combined for the purpose described.

3. The combination with an automobile transmission case having transmission gears and a side opening communicating with one of the gears, and a standardized tire pump construction having a gear case carrying a pump operating gear and having a side opening registering with the transmission case opening, the two cases having registering bolt openings, of a separate and independent housing having bolt openings registering with the bolt openings of the two cases, the housing adapted to be placed between the two cases and establish communication between the case openings, the housing carrying a gear operatively connecting the pump and the transmission mechanism.

4. The combination with standardized tire pump and automobile transmission constructions, having registering openings, of a separate connecting housing adapted to be clamped between the two cases, the housing carrying a gear having its periphery projecting beyond the inner edge of the housing and into the transmission case, the housing gear operatively connecting pump and transmission mechanisms, the parts combined as and for the purpose described.

In testimony whereof I hereunto affix my signature.

GEORGE EDGAR HAZARD.